US012763462B2

(12) United States Patent
Huang et al.

(10) Patent No.: US 12,763,462 B2
(45) Date of Patent: Oct. 13, 2026

(54) CALIBRATION METHOD AND SYSTEM FOR PHASED ARRAY ANTENNA

(71) Applicant: MICROELECTRONICS TECHNOLOGY, INC., Hsinchu (TW)

(72) Inventors: Hao-Yun Huang, Yilan City (TW); Sheng Yuan Wang, Hsinchu (TW)

(73) Assignee: MICROELECTRONICS TECHNOLOGY, INC., Hsinchu (TW)

( * ) Notice: Subject to any disclaimer, the term of this patent is extended or adjusted under 35 U.S.C. 154(b) by 208 days.

(21) Appl. No.: 18/906,501

(22) Filed: Oct. 4, 2024

(65) Prior Publication Data

US 2026/0100504 A1 Apr. 9, 2026

(51) Int. Cl.
*H01Q 3/26* (2006.01)

(52) U.S. Cl.
CPC .................................... *H01Q 3/267* (2013.01)

(58) Field of Classification Search
CPC ........ H01Q 3/267; H01Q 3/28; H01Q 3/2605; H04B 17/21; H04B 17/12; H04B 17/221; G01S 7/40; G01S 7/4004; G01S 7/4017; G01S 7/4026; G01S 2013/0245; G01S 2013/0254
USPC ......... 342/174, 165, 173, 360, 153; 343/703
See application file for complete search history.

(56) References Cited

U.S. PATENT DOCUMENTS 6,507,315 B2 * 1/2003 Purdy .................... H01Q 25/00 342/174
7,088,287 B2 * 8/2006 Lee ........................ H01Q 25/02 342/174
9,985,733 B1 * 5/2018 Lee ........................ H04B 17/29
10,571,503 B2 * 2/2020 Paulsen .................. H01Q 3/267
10,684,318 B1 * 6/2020 Kyrolainen .......... G01R 29/105
10,735,113 B2 * 8/2020 Noda ...................... G01R 29/10
10,797,808 B2 * 10/2020 Qi ......................... H04B 17/191
10,879,608 B2 * 12/2020 Salazar-Cerreno .......................... G01R 29/0821
11,309,977 B2 * 4/2022 Tang ....................... H04B 17/12
11,322,838 B1 * 5/2022 Ramachandran ...... H01Q 3/267
11,444,376 B2 * 9/2022 Abdalla ............... H01Q 21/061
11,469,498 B2 * 10/2022 Rafique .................. H01Q 3/267
11,581,957 B2 * 2/2023 Hou ...................... G01R 29/105
11,804,914 B1 * 10/2023 Yousefi .................. H04B 17/12

(Continued)

FOREIGN PATENT DOCUMENTS

CN 114915356 A 8/2022
CN 116208262 A 6/2023

*Primary Examiner* — Michael W Justice
(74) *Attorney, Agent, or Firm* — MUNCY, GEISSLER, OLDS & LOWE, P.C.

(57) ABSTRACT

The present disclosure provides a calibration method. The calibration method includes operations of: dividing a phased array antenna to N groups, wherein each groups includes M antennas; disposing a probe above a center of an Xth group of the N groups; obtaining a first estimated amplitude and a first estimated phase of a radio wave radiated by a Yth antenna of the M antennas of the Xth group according to a first and a second configurations; obtaining a second estimated amplitude and a second estimated phase of the radio wave radiated by the Yth antenna of the M antennas of the Xth group according to the first and second configurations; and calibrating the Yth antenna according to the first estimated amplitude, the second estimated amplitude, the first estimated phase, and the second estimated phase.

18 Claims, 8 Drawing Sheets

(56) References Cited

U.S. PATENT DOCUMENTS

| | | | | |
|---|---|---|---|---|
| 11,867,738 | B2 * | 1/2024 | Salazar-Cerreno | H04B 17/12 |
| 12,092,674 | B2 * | 9/2024 | Haustein | G01R 29/0871 |
| 12,196,795 | B2 * | 1/2025 | Chou | G01R 29/0878 |
| 12,235,305 | B2 * | 2/2025 | Deckert | G01R 29/10 |
| 12,375,188 | B2 * | 7/2025 | Deckert | H04B 17/0085 |
| 2002/0171583 | A1 * | 11/2002 | Purdy | H01Q 25/00 342/368 |
| 2005/0128137 | A1 * | 6/2005 | Lee | H01Q 1/125 342/174 |
| 2018/0090837 | A1 * | 3/2018 | Schmidt | G01R 29/0821 |
| 2018/0091240 | A1 * | 3/2018 | Noda | H04B 17/104 |
| 2018/0115064 | A1 * | 4/2018 | Safavi-Naeini | H01Q 3/267 |
| 2019/0235003 | A1 * | 8/2019 | Paulsen | H01Q 3/267 |
| 2020/0213018 | A1 * | 7/2020 | Qi | H04B 17/191 |
| 2020/0280128 | A1 * | 9/2020 | Rafique | H01Q 3/267 |
| 2021/0091863 | A1 * | 3/2021 | Tang | H04B 17/12 |
| 2021/0109145 | A1 * | 4/2021 | Haustein | G01R 29/0871 |
| 2021/0384624 | A1 * | 12/2021 | Abdalla | H01Q 21/061 |
| 2021/0405103 | A1 * | 12/2021 | Salazar Cerreno | G01R 29/10 |
| 2022/0149517 | A1 * | 5/2022 | Carlsson | H01Q 21/24 |
| 2022/0407611 | A1 * | 12/2022 | Hou | G01R 29/105 |
| 2023/0168289 | A1 * | 6/2023 | Chou | G01R 29/0878 |
| 2024/0369608 | A1 * | 11/2024 | Deckert | G01R 29/0892 |
| 2024/0372633 | A1 * | 11/2024 | Deckert | H04B 17/0085 |
| 2024/0426889 | A1 * | 12/2024 | Jiang | G01R 29/10 |

* cited by examiner

20

20

CALIBRATION METHOD AND SYSTEM FOR PHASED ARRAY ANTENNA

TECHNICAL FIELD

The present disclosure relates to a calibration method and a calibration system, and more particularly, to calibration method and a calibration system for a phased array antenna.

DISCUSSION OF THE BACKGROUND

A phased array antenna includes numbers of antennas. Due to some non-ideal factors, the antennas may not radiate the same radio wave even when these antennas are set to have the same configuration. The non-ideal factors may due to different length of electrical wires or different loss of radiators. Therefore, each antenna in the phased array antenna has to be calibrated so as to mitigate the issue caused by the above-mentioned factors.

However, the frequency of the radio wave continuously increased in the field of antenna, which results the signal-to-noise ratio (SNR) becomes smaller and smaller. Moreover, when the number of the antennas of the phased array antenna is increased, the time for measuring the antennas also increased. The smaller SNR and longer calibration time hazard the calibration process. Based on the above, how to calibrate the phased array antenna accurately and efficiently becomes a critical issue in this field.

This Discussion of the Background section is provided for background information only. The statements in this Discussion of the Background are not an admission that the subject matter disclosed in this section constitutes prior art to the present disclosure, and no part of this Discussion of the Background section may be used as an admission that any part of this application, including this Discussion of the Background section, constitutes prior art to the present disclosure.

SUMMARY

One aspect of the present disclosure provides a calibration method. The calibration method includes the operations of: dividing a phased array antenna to N groups, wherein each of the N groups comprises M antennas, wherein N is a positive integer greater than 1, and M is a positive integer greater than 1; obtaining a first estimated amplitude and a first estimated phase of a radio wave radiated by a Yth antenna of the M antennas of an Xth group of the N groups according to a first configuration and a second configuration different from the first configuration, wherein X is an integer, Y is an integer, $1 \le X \le N$, and $1 \le Y \le M$; obtaining a second estimated amplitude and a second estimated phase of the radio wave radiated by the Yth antenna of the M antennas of the Xth group according to the first configuration and the second configuration; and calibrating the Yth antenna according to the first estimated amplitude, the second estimated amplitude, the first estimated phase, and the second estimated phase.

In some embodiments, the step of obtaining the first estimated amplitude and the first estimated phase of the radio wave radiated by the Yth antenna of the M antennas of the Xth group includes: measuring a first power and a first phase of a radio wave radiated by the M antennas of the Xth group having the first configuration; measuring a second power and a second phase of the radio wave radiated by the M antennas of the Xth group having the second configuration; and calculating the first estimated amplitude and the first estimated phase of the radio wave radiated by the Yth antenna according to the first power, the second power, the first phase, and the second phase.

In some embodiments, when the Xth group has the first configuration, the radio wave radiated by the Yth antenna of the M antennas has a first set power, a radio wave radiated by at least one Zth antenna of the M antennas has a second set power, and a radio wave radiated by the M antennas excepting the Yth antenna and the at least one Zth antenna has a third set power. Z is an integer not equal to Y, and $1 \le Z \le M$.

In some embodiments, when the Xth group has the second configuration, the Yth antenna of the M antennas is turned off, the radio wave radiated by the at least one Zth antenna of the M antennas has the second set power, and the radio wave radiated by the M antennas excepting the Yth antenna and the at least one Zth antenna has the third set power.

In some embodiments, the first set power is greater than the second set power, the second set power is greater than the third set power.

In some embodiments, the Yth antenna and the at least one Zth antenna are controlled by a first beam forming circuit.

In some embodiments, the M antennas excepting the Yth antenna and the at least one Zth antenna are controlled by a second beam forming circuit different from the first beam forming circuit.

In some embodiments, the first estimated amplitude and the first estimated phase are obtained when the radio wave radiated by the Yth antenna is vertically polarized, and the second estimated amplitude and the second estimated phase are obtained when the radio wave radiated by the Yth antenna is horizontally polarized.

In some embodiments, the step of obtaining the second estimated amplitude and the second estimated phase of the radio wave radiated by the Yth antenna of the M antennas of the Xth group includes: measuring a third power and a third phase of a radio wave radiated by the M antennas of the Xth group having the first configuration; measuring a fourth power and a fourth phase of the radio wave radiated by the M antennas of the Xth group having the second configuration; and calculating the second estimated amplitude and the second estimated phase of the radio wave radiated by the Yth antenna according to the third power, the fourth power, the third phase, and the fourth phase.

In some embodiments, the calibration method further includes disposing a probe above a center of the Xth group.

Another aspect of the present disclosure provides a calibration system. The calibration system is configured to calibrate a phased array antenna. The phased array antenna includes a plurality of antennas. The plurality of antennas are divided to N groups, and each of the N groups comprises M antennas. The calibration system includes a probe, a motion controller, and a processor. The motion controller is configured to hold the probe via a mechanical arm and control a motion of the probe. The processor is configured to: control the motion controller to dispose the probe above a center of an Xth group of the N groups; set the Xth group to have a first configuration; control the Xth group to radiate a vertically polarized radio wave according to the first configuration; control the probe to measure a first power and a first phase of the vertically polarized radio wave; set the Xth group to have a second configuration; control the Xth group to radiate the vertically polarized radio wave according to the second configuration; control the probe to measure a second power and a second phase of the vertically polarized radio wave; obtain a first estimated amplitude and a first estimated phase of a Yth antenna of the M antennas of the Xth group according to the first power, the second power, the first phase, and the second phase; and calibrate the Yth antenna according to the first estimated amplitude and the first estimated phase.

In some embodiments, the processor is further configured to: set the Xth group to have the first configuration; control the Xth group to radiate a horizontally polarized radio wave according to the first configuration; control the probe to measure a third power and a third phase of the horizontally polarized radio wave; set the Xth group to have the second configuration; control the Xth group to radiate the horizontally polarized radio wave according to the second configuration; control the probe to measure a fourth power and a fourth phase of the horizontally polarized radio wave; and obtain a second estimated amplitude and a second estimated phase of the Yth antenna according to the third power, the fourth power, the third phase, and the fourth phase.

In some embodiments, the processor calibrates the Yth antenna further according to the second estimated amplitude and the second estimated phase.

In some embodiments, when the Xth group has the first configuration, a vertically polarized radio wave radiated by the Yth antenna of the M antennas has a first set power, a vertically polarized radio wave radiated by at least one Zth antenna of the M antennas has a second set power, and a vertically polarized radio wave radiated by the M antennas excepting the Yth antenna and the at least one Zth antenna has a third set power.

In some embodiments, when the Xth group has the second configuration, the Yth antenna of the M antennas is turned off, the vertically polarized radio wave radiated by the at least one Zth antenna of the M antennas has the second set power, and the vertically polarized radio wave radiated by the M antennas excepting the Yth antenna and the at least one Zth antenna has the third set power.

In some embodiments, the first set power is greater than the second set power, the second set power is greater than the third set power.

In some embodiments, the Yth antenna and the at least one Zth antenna are controlled by a first beam forming circuit.

In some embodiments, the M antennas excepting the Yth antenna and the at least one Zth antenna are controlled by a second beam forming circuit different from the first beam forming circuit.

The foregoing has outlined rather broadly the features and technical advantages of the present disclosure in order that the detailed description of the disclosure that follows may be better understood. Additional features and advantages of the disclosure will be described hereinafter, and form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

A more complete understanding of the present disclosure may be derived by referring to the detailed description and claims when considered in connection with the Figures, where like reference numbers refer to similar elements throughout the Figures.

DETAILED DESCRIPTION

Figure 1:
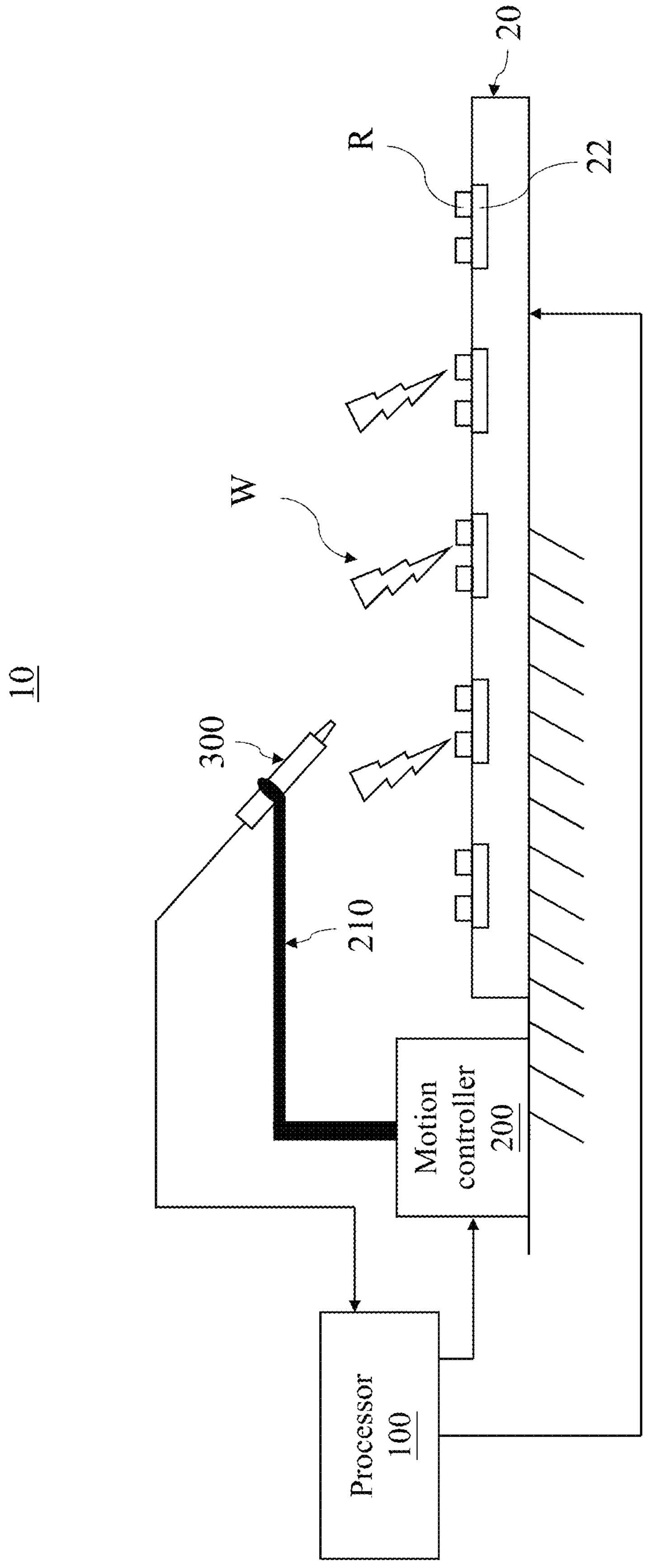
FIG. 1 is a schematic diagram of a calibration system according to some embodiments of the present disclosure.

Embodiments, or examples, of the disclosure illustrated in the drawings are now described using specific language. It shall be understood that no limitation of the scope of the disclosure is hereby intended. Any alteration or modification of the described embodiments, and any further applications of principles described in this document, are to be considered as normally occurring to one of ordinary skill in the art to which the disclosure relates. Reference numerals may be repeated throughout the embodiments, but this does not necessarily mean that feature(s) of one embodiment apply to another embodiment, even if they share the same reference numeral.

It shall be understood that, although the terms first, second, third, etc. may be used herein to describe various elements, components, regions, layers or sections, these elements, components, regions, layers or sections are not limited by these terms. Rather, these terms are merely used to distinguish one element, component, region, layer or section from another element, component, region, layer or section. Thus, a first element, component, region, layer or section discussed below could be termed a second element, component, region, layer or section without departing from the teachings of the present inventive concept.

The terminology used herein is for the purpose of describing particular example embodiments only and is not intended to be limiting to the present inventive concept. As used herein, the singular forms "a," "an" and "the" are intended to include the plural forms as well, unless the context clearly indicates otherwise. It shall be further understood that the terms "comprises" and "comprising," when used in this specification, point out the presence of stated features, integers, steps, operations, elements, or components, but do not preclude the presence or addition of one or more other features, integers, steps, operations, elements, components, or groups thereof.

FIG. 1 is a schematic diagram of a calibration system 10 according to some embodiment of the present disclosure. The calibration system 10 is configured to calibrate a phased array antenna 20. The calibration system 10 includes a processor 100, a motion controller 200, and a probe 300.

The processor 100 is coupled to the motion controller 200, the probe 300, and the phased array antenna 20. The processor 100 is configured to control the operation of the phased array antenna 20, and control the motion controller 200 to move the probe 300 so as to measure a power and a phase of a radio wave W radiated by the phased array antenna 20.

The motion controller 200 is configured to hold the probe 300 via a mechanical arm 210, and control a motion of the probe 300.

The probe 300 is configure to sense the power and the phase of the radio wave W and transmit the sensing result to the processor 100. The processor 100 is able to process the sensing result (such as power and phase) to generate the associated parameters of the radio wave W radiated by the phased array antenna 20.

The phased array antenna 20 includes a plurality of antenna R and a plurality of beam forming circuits 22. In some embodiments, each of beam forming circuit 22 is configured to control more than one antenna R. In other words, a beam forming circuit 22 corresponds to at least two antennas R.

Figure 2:
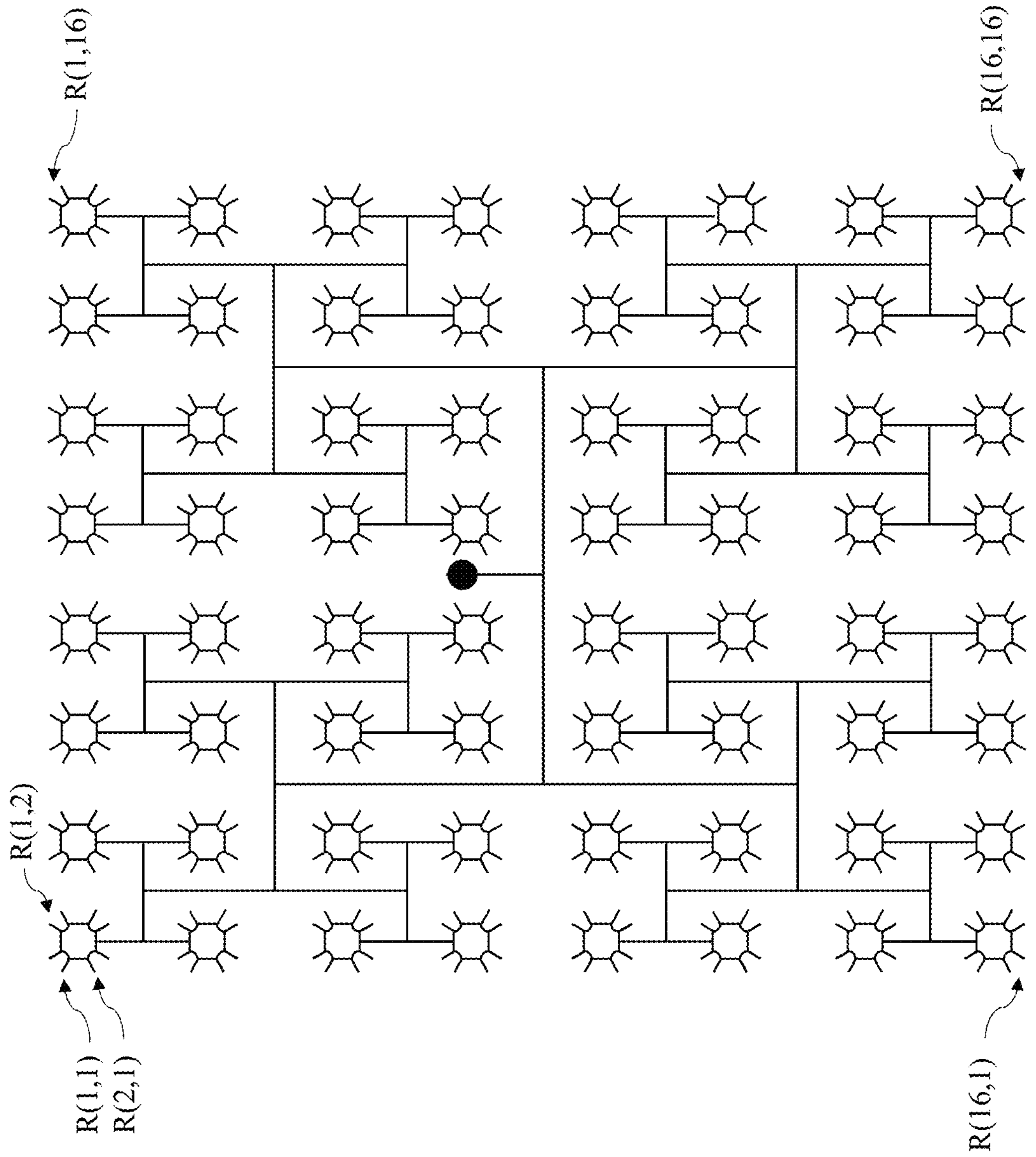
FIG. 2 is a schematic diagram of a phased array antenna according to some embodiment of the present disclosure.

FIG. 2 is a schematic diagram of the phased array antenna 20 according to some embodiment of the present disclosure. The antennas R of the phased array antenna 20 are arranged as an array. To facilitate understanding, a 16×16 antenna array is illustrated, and the present disclosure is described according to the 16×16 antenna array. The arrangement of antenna array is provided for illustrative purposes and not intended to be limiting. It should be appreciated that the antennas R in the phased array antenna 20 can have other quantities and arrangements.

In some embodiments, each of the antennas R is identical to each other. However, for the ease of explanation, the antennas are designated with R(i,j), which indicates that the instant antenna is located at the ith row and jth column of the 16×16 antenna array. For example, the antennas R(1,1), R(1,2), and R(1,16) are located at the same row (i.e., the first row) of the 16×16 antenna array, the antennas R(1,1), R(2,1), and R(16,1) are located at the same column (i.e., the first column) of the 16×16 antenna array, and the antennas R(16,1) and R(16,16) are located at the sixteenth row of the 16×16 antenna array.

When the calibration system 10 calibrates the phased array antenna 20, the calibration system 10 measures the radio wave W radiated by the phased array antenna 20 to obtain the information such as power and phase of the radio wave W.

In some conventional arts, the probe is put above the antenna to sense the radio wave, and the calibration system has to move the probe and align the probe with the antenna for each antenna. In other words, the conventional calibration system measures each antenna along with a process of moving and aligning the probe. However, when there is a huge amount of antennas in a phased array antenna, it is time-consuming to move and align the probe.

Compared to the conventional arts, the calibration system 10 of the present disclosure can dispose the probe 300 at the same position to measure more than one antennas. Therefore, the time for moving and aligning the probe 300 can be reduced. More particularly, before the calibration, the phased array antenna 20 is divided into several groups as illustrated in FIG. 3, and the calibration system 10 disposes the probe 300 on each group to measure the antennas in the corresponding group without moving the probe 300 within the group.

Figure 3:
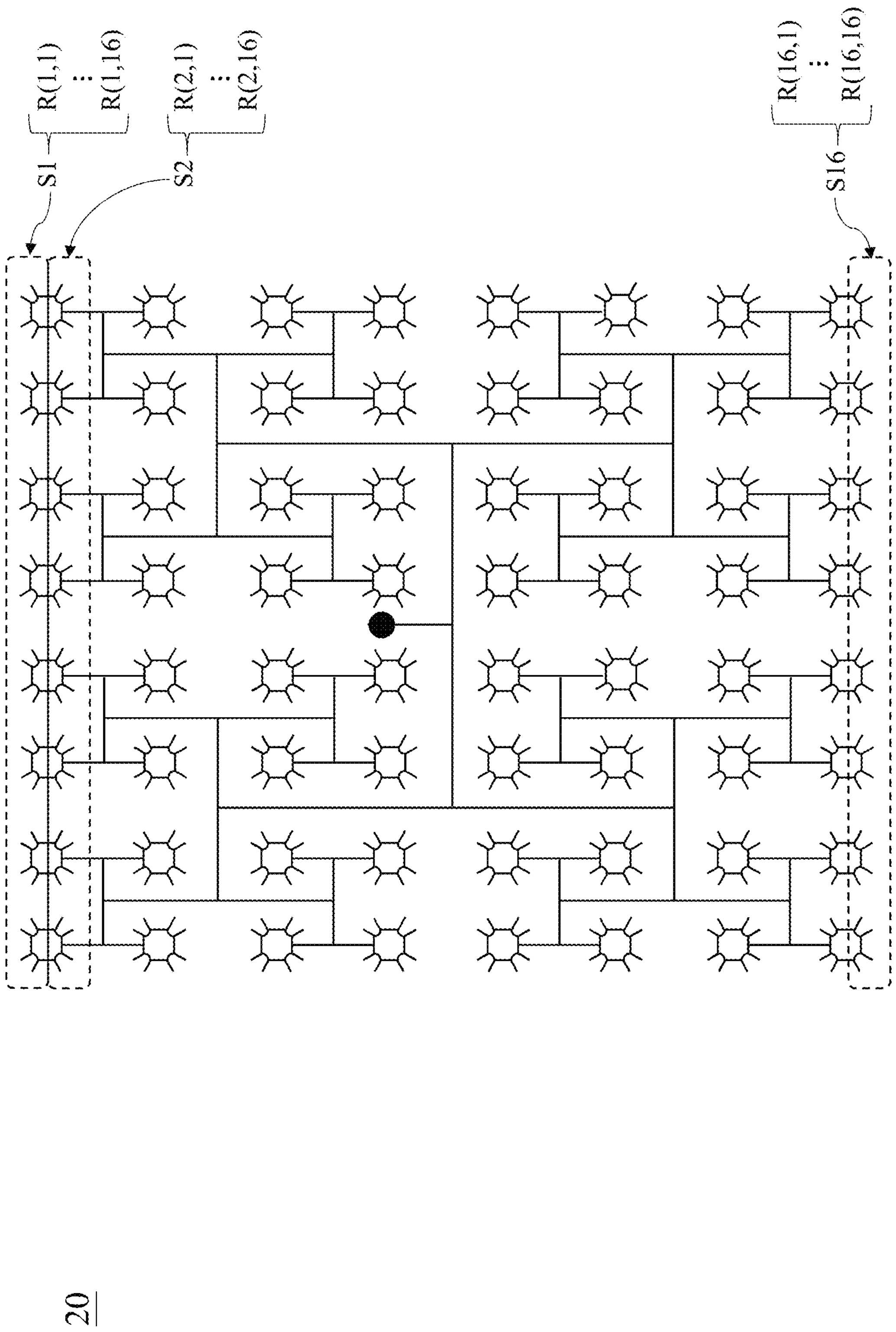
FIG. 3 and FIG. 4 are schematic diagrams of a phased array antenna being divided to several groups according to some embodiment of the present disclosure.

FIG. 3 is a schematic diagram of the phased array antenna 20 according to some embodiment of the present disclosure. In FIG. 3, the antennas R of the phased array antenna 20 are divided into several groups S1, S2 to S16. Each group includes 16 antennas R. For example, the group S1 includes antenna R(1,1) to antenna R(1,16). In some embodiments, when the calibration system 10 is performing the calibration to the group S1, the probe 300 is moved and disposed on the group S1. In some embodiments, when the calibration system 10 is performing the calibration to the group S1, the probe 300 is moved and disposed on a center of the group S1.

The calibration system 10 then measures the radio wave W of each of the antennas R in the group S1. Namely, the calibration system 10 fixes the position of the probe 300 on the group S1 and then measures the radio wave W radiated by antenna R(1,1) to antenna R(1,16), respectively. More specifically, during the measurements of antenna R(1,1) to antenna R(1,16), the position of the probe 300 is not changed.

After the measurements of antenna R(1,1) to antenna R(1,16) are completed, the calibration system 10 moves and disposes the probe 300 on the group S2 for the following measurements and so on.

The groups S1 to S16 shown in FIG. 3 are provided for illustrative purposes and not intended to be limiting. It should be appreciated that the antennas R can be divided into different groups. In other embodiments, the antennas R can be divided into groups S1', S2' to S16' as illustrated in FIG. 4.

Figure 4:
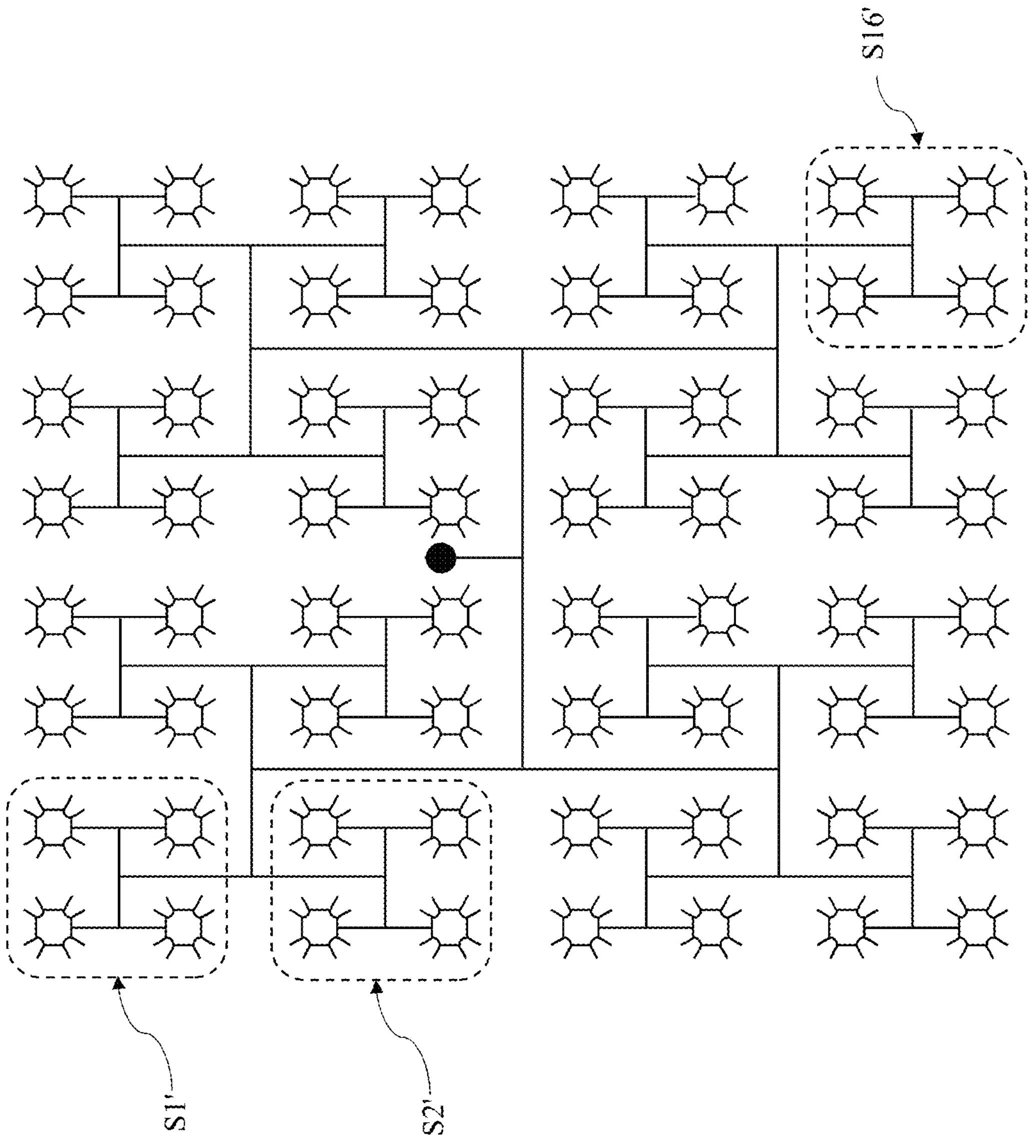

In FIG. 4, the calibration system 10 moves and disposes the probe 300 on the group S1' and then respectively measures the antennas R in the group S1'. Further, the calibration system 10 moves and disposes the probe 300 on the group S2' for the following measurements and so on.

Figure 5:
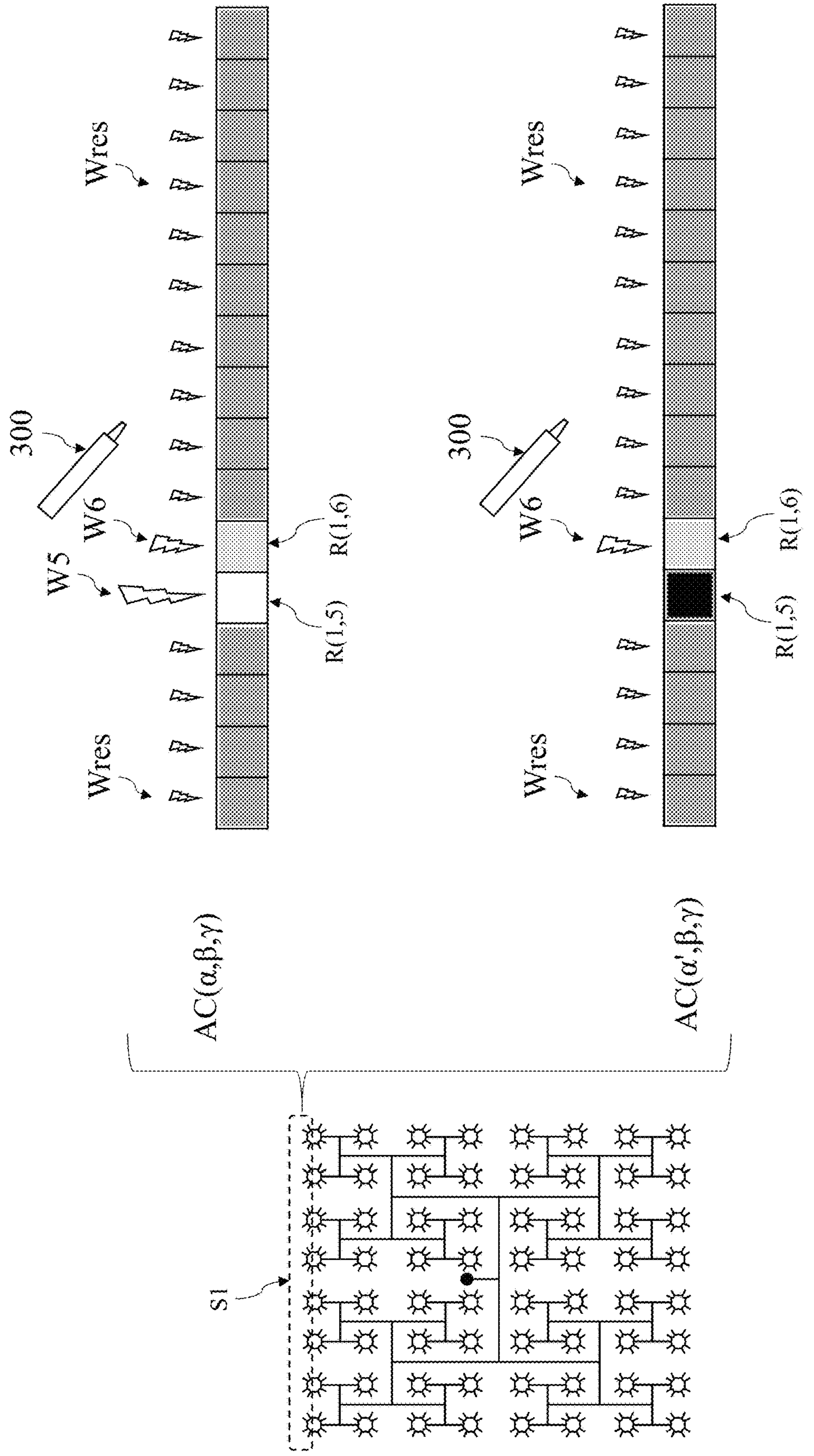
FIG. 5 is a schematic diagram of measurements of a group according to some embodiments of the present disclosure.

FIG. 5 is a schematic diagram of the measurements of group S1 according to some embodiments of the present disclosure. In some embodiments, the measurements of each of groups S1 to S16 are the same. For the sake of brevity, only the measurements of group S1 is illustrated, and the measurements of other groups S2 to S16 are omitted.

When the calibration system 10 is measuring the group S1, the calibration system 10 measures the antennas R(1,1) to R(1,16) separately. For the sake of brevity, FIG. 5 only illustrates the calibrate system 10 measuring the antenna R(1,5).

The measurements of the antenna R(1,5) include several steps, and these steps include a first portion using vertical polarization and a second portion using horizontal polarization.

The first portion includes: (1) setting the group S1 to have a configuration AC(α,β,γ) and exciting the antennas R in group S1 to radiate radio wave which is vertically polarized, and turning off the antennas R in other groups; (2) using the probe 300 to measure a power Ponv and a phase θonv of the radio wave radiated by the group S1; (3) setting the group S1 to have a configuration AC(α',β,γ) and exciting the antennas R in group S1 to radiate the radio wave which is vertically polarized; and (4) using the probe 300 to measure a power Poffv and a phase θoffv of the radio wave radiated by the group S1.

The second portion includes: (1) setting the group S1 to have the configuration AC(α,β,γ) and exciting the antennas R in group S1 to radiate a radio wave which is horizontally polarized, and turning off the antennas R in other groups; (2) using the probe 300 to measure a power Ponh and a phase θonh of the radio wave radiated by the group S1; (3) setting the group S1 to have the configuration AC(α',β,γ) and exciting the antennas R in group S1 to radiate the radio wave which is horizontally polarized; (4) using the probe 300 to measure a power Poffh and a phase θoffh of the radio wave radiated by the group S1.

The first portion is similar to the second portion. For the sake of brevity, only the first portion is described.

The configuration AC(α,β,γ) indicates three attenuation factors α, β, and γ respectively provided to the antenna R(1,5), at least one antenna R which is controlled by the same beam forming circuit 22 as the antenna R(1,5), and the rest of antennas R in the group S1. In the embodiments of FIG. 5, the at least one antenna R which is controlled by the same beam forming circuit 22 as the antenna R(1,5) includes the antenna R(1,6). For the sake of clarity, the beam forming circuits 22 are omitted in FIG. 5.

In some embodiments, when the antennas R are excited to radiate radio wave, each antenna R uses the maximum power according to a default setting. When the configuration AC(α,β,γ) is applied, a power of a radio wave W5 radiated by the antenna R(1,5) is attenuated by a dB from the maximum power, a power of a radio wave W6 radiated by the antenna R(1,6) is attenuated by R dB from the maximum power, and a power of radio wave Wres radiated by the rest of antennas R in the group S1 is attenuated by γ dB from the maximum power.

In some embodiments, the attenuation factor α is equal to 0, that means the power of the radio wave W5 radiated by the antenna R(1,5) is remained at the maximum power. In some embodiments the attenuation factor β is greater than the attenuation factor α, and the attenuation factor γ is greater than the attenuation factor β. In some embodiments, the attenuation factor β is about 7.5 dB. In some embodiments, the attenuation factor γ is about 15.5 dB. In some embodiments, after the attenuation, the power of the radio wave Wres is still greater than a noise level of the phased array antenna 20. Alternatively stated, when the configuration AC(α,β,γ) is applied, the antenna R(1,5) has a first set power, the antenna R(1,6) has a second set power, and the rest of antennas R in the group S1 have a third set power. Because the attenuation factor α is less than β, the first set power is greater than the second set power. Because the attenuation factor β is less than γ, the second set power is greater than the third set power.

The configuration AC(α',β,γ) is similar to the configuration AC(α,β,γ) and indicates three attenuation factors α', β, and γ respectively provided to the antenna R(1,5), the antenna R(1,6), and the rest of antennas R in the group S1. In some embodiments, the attenuation factors α' is sufficient to disable the antenna R(1,5). In other words, the antenna R(1,5) does not radiate the radio wave W5 when the group S1 has the configuration AC(α',β,γ). In some embodiments, the attenuation factors α' is greater than attenuation factors γ.

After the above measurements, the power Poffv, the power Ponv, the phase θoffv, the phase θonv, the power Poffh, the power Ponh, the phase θoffh, and the phase θonh are obtained and transmitted to the processor 100 of the calibration system 10. The processor 100 is configured to process the power Poffv, the power Ponv, the phase θoffv, the phase θonv, the power Poffh, the power Ponh, the phase θoffh, and the phase θonh so as to obtain an estimated amplitude Aestv, an estimated amplitude Aesth, an estimated phase θestv, and an estimated phase θesth of the radio wave W5 according to the following equations (1) to (4).

$$[\theta_{estV}^{(1,5)}, A_{estV}^{(1,5)}] = \tan^{-1}\left[\frac{\mathrm{Re}(z_V^{(1,5)})}{\mathrm{Im}(z_V^{(1,5)})}\right] \cdot \sqrt{[\mathrm{Re}(z_V^{(1,5)})]^2 + [\mathrm{Im}(z_V^{(1,5)})]^2}. \quad (1)$$

$$[\theta_{estH}^{(1,5)}, A_{estH}^{(1,5)}] = \tan^{-1}\left[\frac{\mathrm{Re}(z_H^{(1,5)})}{\mathrm{Im}(z_H^{(1,5)})}\right] \cdot \sqrt{[\mathrm{Re}(z_H^{(1,5)})]^2 + [\mathrm{Im}(z_H^{(1,5)})]^2}. \quad (2)$$

$$z_V^{(1,5)} = \sqrt{Ponv} \cdot \exp(j \cdot \theta onv) - \sqrt{Poffv} \cdot \exp(j \cdot \theta offv). \quad (3)$$

$$z_H^{(1,5)} = \sqrt{Ponh} \cdot \exp(j \cdot \theta onh) - \sqrt{Poffh} \cdot \exp(j \cdot \theta offh). \quad (4)$$

It should be noted that the superscripts (1,5) in equations (1) to (4) indicates that the estimated results corresponding to the antenna R(1,5).

In some embodiments, the estimated amplitude Aestv, the estimated amplitude Aesth, the estimated phase θestv, and the estimated phase θesth are estimated values because these parameters are not measured from the radio wave W5 directly. Namely, these estimated parameters are extracted from the measured values of the power Ponv, the power Poffv the power Ponh, the power Poffh, the phase θonv, and the phase θoffv, the phase θonh, and the phase θoffh.

In some embodiments, the processor 100 calibrates the antenna R(1,5) according to the estimated amplitude Aestv, the estimated amplitude Aesth, the estimated phase θestv, and the estimated phase θesth.

Figure 6:
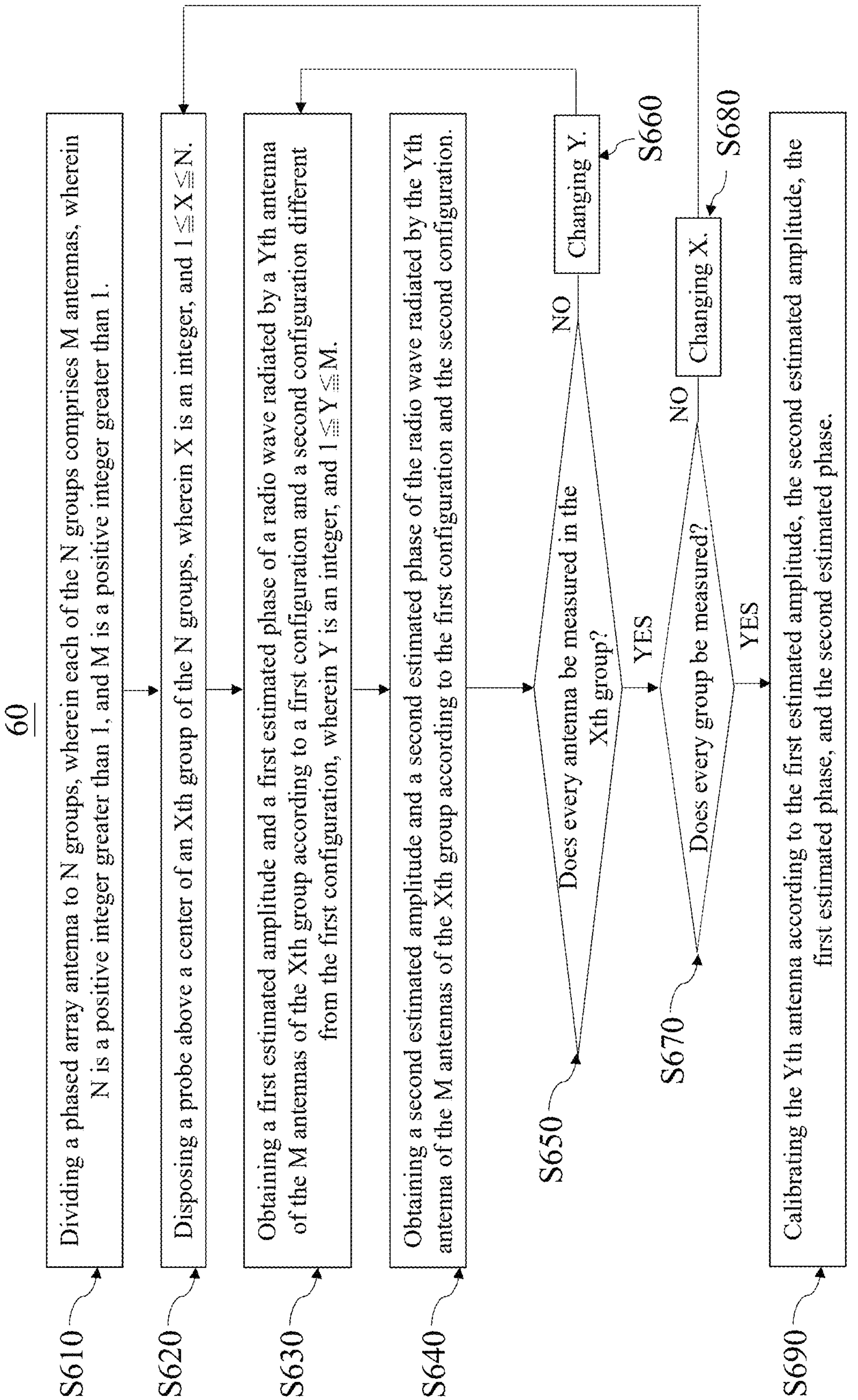
FIG. 6, FIG. 7, and FIG. 8 are flowcharts of a calibration method according to some embodiments of the present disclosure.

FIG. 6 is a flowchart of a calibration method 60 according to some embodiments of the present disclosure. The calibration method 60 includes operations S610, S620, S630, S640, S650, S660, S670, S680, and S690. In some embodiments, the calibration method 60 is performed by the calibration system 10. To facilitate understanding, the calibration method 60 is described with respect to the calibration system 10.

In operation S610, the phased array antenna 20 is divided to N groups. Each of the N groups includes M antennas R, in which N is a positive integer greater than 1, and M is a positive integer greater than 1. For the calibration system 10, the phased array antenna 20 is divided to 16 groups S1 to S16. Each of the groups S1 to S16 includes 16 antennas R.

In operation S620, the probe 300 is disposed above the center of an Xth group of the N groups, in which X is an integer, and 1≤X≤N. In some embodiments, the calibration system 10 starts with the first group S1 (i.e., X=1), and when the following operations (e.g., operations S630 to S660) associated with the first group S1 are completed, the calibration system 10 keeps go on to perform the operation S620 with the second group S2 (i.e., X=2) until all of the groups are done.

In operation S630, the processor 100 is used to calculate the estimated amplitude Aestv and the estimated phase θestv of a radio wave radiated by a Yth antenna of the M antennas of the Xth group according to the power Ponv and the phase θonv of the radio wave radiated by the M antennas of the Xth group having the configuration AC(α,β,γ) and the power Poffv and phase θoffv of the radio wave radiated by the M antennas of the Xth group having the configuration AC(α',β,γ), in which Y is an integer, and 1≤Y≤M. For the calibration system 10, the processor 100 is used to calculate the estimated amplitude Aestv and the estimated phase θestv of the radio wave radiated by the first antenna (i.e., Y=1) of the first group S1 (i.e., X=1), and when the following operation (e.g., operation S640) associated with the first antenna is completed, the calibration system 10 keeps go on to perform the operation S630 with the second antenna (i.e., Y=2) until all of the antennas R in the Xth group are done.

In some embodiments, the estimated amplitude Aestv and the estimated phase θestv can be obtained via the equations (1) and (3).

In operation S640, the processor 100 is used to calculate the estimated amplitude Aesth and the estimated phase θesth of the radio wave radiated by the Yth antenna of the M antennas of the Xth group according to the power Ponh and the phase θonh of the radio wave radiated by the M antennas of the Xth group having the configuration AC(α,β,γ) and the power Poffh and phase θoffh of the radio wave radiated by the M antennas of the Xth group having the configuration AC(α',β,γ). For the calibration system 10, the processor 100 is used to calculate the estimated amplitude Aesth and the estimated phase θesth of the radio wave radiated by the first antenna of the first group S1.

In some embodiments, the estimated amplitude Aesth and the estimated phase θesth can be obtained via the equations (2) and (4).

In some embodiments, the operations S630 and S640 can be switched. In some embodiments, one of the operations S630 and S640 can be omitted.

In operation S650, a determination of whether every antenna R in the Xth group is measured is made. When there is still an antenna R hasn't been measured, the calibration method 60 proceeds to operation S660 to change the index of Y, and then proceeds to operation S630. When all of the antennas R are measured, the calibration method 60 proceeds to operation S670 to determine whether every group of the phased array antenna 20 are measured. When there is still a group hasn't been measured, the calibration method 60 proceeds to operation S680 to change the index of X, and then proceeds to operation S620. When the all of the groups are measured, the calibration method 60 proceeds to operation S690.

In operation S690, the Yth antenna is calibrated according to the estimated amplitude Aestv, the estimated amplitude Aesth, the estimated phase θestv, and the estimated phase θesth.

In some embodiments, before the operation S690, the estimated amplitude Aestv, the estimated amplitude Aesth, the estimated phase θestv, and the estimated phase θesth of each of the antennas R in the phased array antenna 20 are obtained. The processor 100 is configured to calculate the offset to the phase and the amplitude of each antenna R according to the estimated amplitude Aestv, the estimated amplitude Aesth, the estimated phase θestv, and the estimated phase θesth.

The processor 100 is configured to select a phase θmaxv from all of the estimated phases θestv and a phase θmaxh from all of the estimated phases θesth. The phase θmaxv is a phase which has the greatest value among all of the estimated phases θestv, and the phase θmaxh is a phase which has the greatest value among all of the estimated phases θesth.

Further, the processor 100 is configured to calculate a root mean square Armsv of the estimated amplitudes Aestv and a root mean square Armsh of the estimated amplitudes Aesth.

Then, the processor 100 is configured to calculate a phase offset φ in order to maintain orthogonality between vertical polarization and horizontal polarization and an amplitude attenuation offset δ in order to make sure vertical polarization and horizontal polarization have the same root mean square power using the following equations (5) and (6).

$$\varphi = 90 - [\max(\theta\max v,\ \theta\max h) - \min(\theta\max v,\ \theta\max h)]. \quad (5)$$

$$\delta = 20\cdot\log\frac{\max(Armsv,\ Armsh)}{\min(Armsv,\ Armsh)}. \quad (6)$$

Next, the processor 100 is configured to adjust the phase and the amplitude of the antenna R using the following equations (7) to (14). It should be noted that the index (i,j) in the equations (7) to (14) indicates the index (i,j) of the antenna R(i,j).

When the phase θmaxh is greater than or equal to the phase θmaxv, the processor 100 uses the equations (7) and (8) to calibrate the phase of the antenna R. More specifically, the phase θcalh and the phase θcalv are used for phase adjustment, and the antenna R would radiate the radio wave with a phase of phase θmaxv adding phase offset φ (φ+θmaxh) for horizontal polarization and the phase θmaxv for vertical polarization.

$$\theta_{calh}^{(i,j)} = (\theta\max h + \varphi) - \theta_{esth}^{(i,j)}. \quad (7)$$

$$\theta_{calv}^{(i,j)} = \theta\max v - \theta_{estv}^{(i,j)}. \quad (8)$$

When the phase θmaxh is not greater than the phase θmaxv, the processor 100 uses the equations (9) and (10) to calibrate the phase of the antenna R.

$$\theta_{calh}^{(i,j)} = \theta\max h - \theta_{esth}^{(i,j)}. \quad (9)$$

$$\theta_{calv}^{(i,j)} = (\theta\max v + \varphi) - \theta_{estv}^{(i,j)}. \quad (10)$$

When the root mean square Armsh is greater than or equal to the room mean square Armsv, the processor 100 uses the equations (11) and (12) to calibrate the amplitude of the antenna R. More specifically, the amplitude Acalh and the amplitude Acalv are used for amplitude adjustment, and the antenna R would radiate the radio wave with an amplitude of Aesth·$10^{\delta/20}$ for horizontal polarization and the amplitude Aestv for vertical polarization.

$$A_{calh}^{(i,j)} = A_{esth}^{(i,j)}\cdot 10^{\delta/20}. \quad (11)$$

$$A_{calv}^{(i,j)} = A_{estv}^{(i,j)}. \quad (12)$$

When the root mean square Armsh is not greater than the room mean square Armsv, the processor 100 uses the equations (13) and (14) to calibrate the amplitude of the antenna R.

$$A_{calh}^{(i,j)} = A_{esth}^{(i,j)}. \quad (13)$$

$$A_{calv}^{(i,j)} = A_{estv}^{(i,j)}\cdot 10^{\delta/20}. \quad (14)$$

Figure 7:
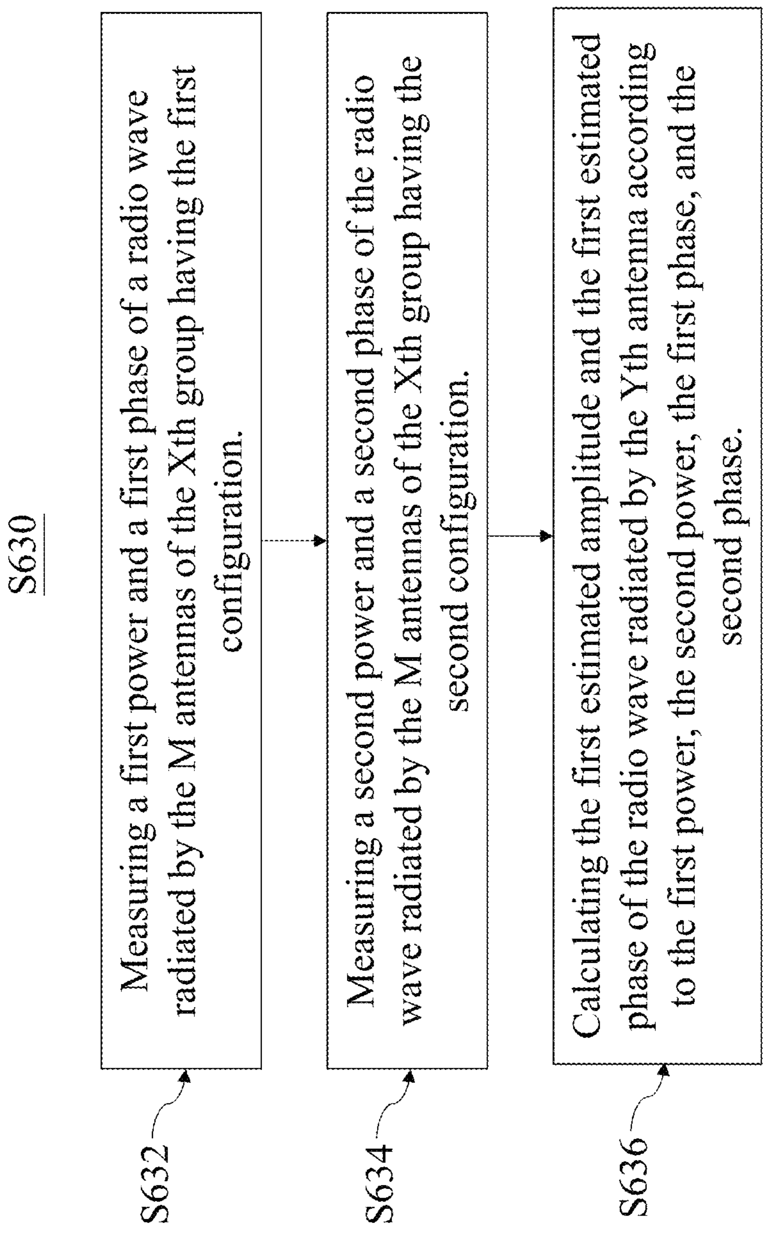

FIG. 7 is a flowchart of operation S630 of the calibration method 60 according to some embodiments of the present disclosure. The operation S630 includes operations S632, S634, and S636.

In operation S632, the power Ponv and the phase θonv of the radio wave radiated by the M antennas of the Xth group having the configuration AC(α,β,γ) are measured by the probe 300.

In operation S634, the power Poffv and phase θoffv of the radio wave radiated by the M antennas of the Xth group having the configuration AC(α',β,γ) are measured by the probe 300.

In operation S636, the estimated amplitude Aestv and the estimated phase θestv of the radio wave radiated by the Yth antenna are obtained according to the power Ponv, the phase θonv, the power Poffv, and phase θoffv.

Figure 8:
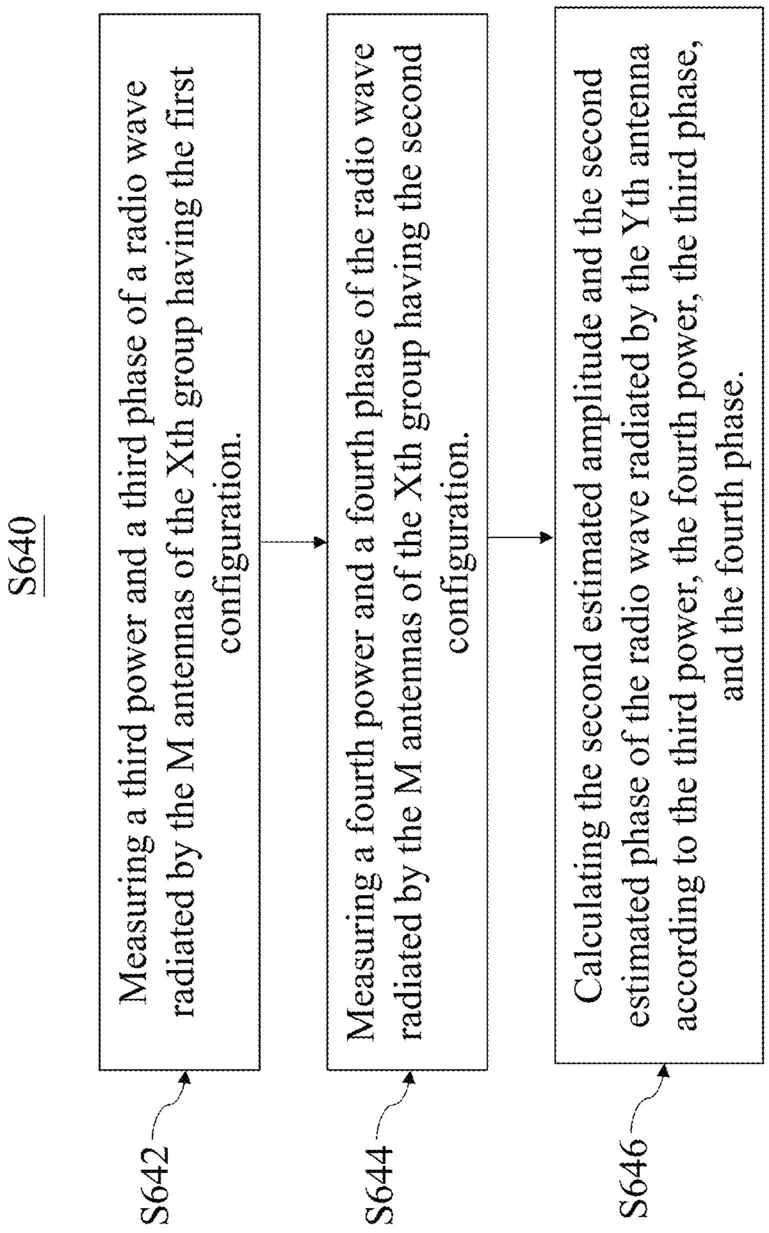

FIG. 8 is a flowchart of operation S640 of the calibration method 60 according to some embodiments of the present disclosure. The operation S640 includes operations S642, S644, and S646.

In operation S642, the power Ponh and the phase θonh of the radio wave radiated by the M antennas of the Xth group having the configuration AC(α,β,γ) are measured by the probe 300.

In operation S644, the power Poffh and phase θoffh of the radio wave radiated by the M antennas of the Xth group having the configuration AC(α',β,γ) are measured by the probe 300.

In operation S646, the estimated amplitude Aesth and the estimated phase θesth of the radio wave radiated by the Yth antenna are obtained according to the power Ponh, the phase θonh, the power Poffh, and phase θoffh.

In some embodiments, the configuration AC(α,β,γ), the configuration AC(α',β,γ), and the associated operations shown in FIG. 5 can be applied to the operations S630 and S640.

One aspect of the present disclosure provides a calibration method. The calibration method includes the operations of: dividing a phased array antenna to N groups, wherein each of the N groups includes M antennas, wherein N is a positive integer greater than 1, and M is a positive integer greater than 1; obtaining a first estimated amplitude and a first estimated phase of a radio wave radiated by a Yth antenna of the M antennas of an Xth group of the N groups according to a first configuration and a second configuration different from the first configuration, wherein X is an integer, Y is an integer, 1≤X≤N, and 1≤Y≤M; obtaining a second estimated amplitude and a second estimated phase of the radio wave radiated by the Yth antenna of the M antennas of the Xth group according to the first configuration and the second configuration; and calibrating the Yth antenna according to the first estimated amplitude, the second estimated amplitude, the first estimated phase, and the second estimated phase.

Another aspect of the present disclosure provides a calibration system. The calibration system is configured to calibrate a phased array antenna. The phased array antenna includes a plurality of antennas. The plurality of antennas are divided to N groups, and each of the N groups comprises M antennas. The calibration system includes a probe, a motion controller, and a processor. The motion controller is configured to hold the probe via a mechanical arm and control a motion of the probe. The processor is configured to: control the motion controller to dispose the probe above a center of an Xth group of the N groups; set the Xth group to have a first configuration; control the Xth group to radiate a vertically polarized radio wave according to the first configuration; control the probe to measure a first power and a first phase of the vertically polarized radio wave; set the Xth group to have a second configuration; control the Xth group to radiate the vertically polarized radio wave according to the second configuration; control the probe to measure a second power and a second phase of the vertically polarized radio wave; obtain a first estimated amplitude and a first estimated phase of a Yth antenna of the M antennas of the Xth group according to the first power, the second power, the first phase, and the second phase; and calibrate the Yth antenna according to first estimated amplitude and the first estimated phase.

Although the present disclosure and its advantages have been described in detail, it should be understood that various changes, substitutions and alterations can be made herein without departing from the spirit and scope of the disclosure as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed, that perform substantially the same function or achieve substantially the same result as the corresponding embodiments described herein, may be utilized according to the present disclosure. Accordingly, the appended claims are intended to include within their scope such processes, machines, manufacture, compositions of matter, means, methods, and steps.

What is claimed is:

1. A calibration method, comprising:

dividing a phased array antenna to N groups, wherein each of the N groups comprises M antennas, wherein N is a positive integer greater than 1, and M is a positive integer greater than 1;

obtaining a first estimated amplitude and a first estimated phase of a radio wave radiated by a Yth antenna of the M antennas of an Xth group of the N groups according to a first configuration and a second configuration different from the first configuration, wherein X is an integer, Y is an integer, 1≤X≤N, and 1≤Y≤M;

obtaining a second estimated amplitude and a second estimated phase of the radio wave radiated by the Yth antenna of the M antennas of the Xth group according to the first configuration and the second configuration; and calibrating the Yth antenna according to the first estimated amplitude, the second estimated amplitude, the first estimated phase, and the second estimated phase.

2. The calibration method of claim 1, wherein the step of obtaining the first estimated amplitude and the first estimated phase of the radio wave radiated by the Yth antenna of the M antennas of the Xth group comprises:

measuring a first power and a first phase of a radio wave radiated by the M antennas of the Xth group having the first configuration;

measuring a second power and a second phase of the radio wave radiated by the M antennas of the Xth group having the second configuration; and calculating the first estimated amplitude and the first estimated phase of the radio wave radiated by the Yth antenna according to the first power, the second power, the first phase, and the second phase.

3. The calibration method of claim 2, wherein when the Xth group has the first configuration, the radio wave radiated by the Yth antenna of the M antennas has a first set power, a radio wave radiated by at least one Zth antenna of the M antennas has a second set power, and a radio wave radiated by the M antennas excepting the Yth antenna and the at least one Zth antenna has a third set power, wherein Z is an integer not equal to Y, and 1≤Z≤M.

4. The calibration method of claim 3, wherein when the Xth group has the second configuration, the Yth antenna of the M antennas is turned off, the radio wave radiated by the at least one Zth antenna of the M antennas has the second set power, and the radio wave radiated by the M antennas excepting the Yth antenna and the at least one Zth antenna has the third set power.

5. The calibration method of claim 3, wherein the first set power is greater than the second set power, the second set power is greater than the third set power.

6. The calibration method of claim 3, wherein the Yth antenna and the at least one Zth antenna are controlled by a first beam forming circuit.

7. The calibration method of claim 6, wherein the M antennas excepting the Yth antenna and the at least one Zth antenna are controlled by a second beam forming circuit different from the first beam forming circuit.

8. The calibration method of claim 1, wherein the first estimated amplitude and the first estimated phase are obtained when the radio wave radiated by the Yth antenna is vertically polarized, and the second estimated amplitude and the second estimated phase are obtained when the radio wave radiated by the Yth antenna is horizontally polarized.

9. The calibration method of claim 8, wherein the step of obtaining the second estimated amplitude and the second estimated phase of the radio wave radiated by the Yth antenna of the M antennas of the Xth group comprises:

measuring a third power and a third phase of a radio wave radiated by the M antennas of the Xth group having the first configuration;

measuring a fourth power and a fourth phase of the radio wave radiated by the M antennas of the Xth group having the second configuration; and calculating the second estimated amplitude and the second estimated phase of the radio wave radiated by the Yth antenna according to the third power, the fourth power, the third phase, and the fourth phase.

10. The calibration method of claim 1, further comprising: disposing a probe above a center of the Xth group.

11. A calibration system, configured to calibrate a phased array antenna, wherein the phased array antenna comprises a plurality of antennas, wherein the plurality of antennas are divided to N groups, and each of the N groups comprises M antennas, comprising:

a probe;

a motion controller, configured to hold the probe via a mechanical arm and control a motion of the probe; and a processor, configured to:

control the motion controller to dispose the probe above a center of an Xth group of the N groups;

set the Xth group to have a first configuration;

control the Xth group to radiate a vertically polarized radio wave according to the first configuration;

control the probe to measure a first power and a first phase of the vertically polarized radio wave;

set the Xth group to have a second configuration;

control the Xth group to radiate the vertically polarized radio wave according to the second configuration;

control the probe to measure a second power and a second phase of the vertically polarized radio wave;

obtain a first estimated amplitude and a first estimated phase of a Yth antenna of the M antennas of the Xth group according to the first power, the second power, the first phase, and the second phase; and calibrate the Yth antenna according to first estimated amplitude and the first estimated phase.

12. The calibration system of claim 11, wherein the processor is further configured to:

set the Xth group to have the first configuration;

control the Xth group to radiate a horizontally polarized radio wave according to the first configuration;

control the probe to measure a third power and a third phase of the horizontally polarized radio wave;

set the Xth group to have the second configuration;

control the Xth group to radiate the horizontally polarized radio wave according to the second configuration;

control the probe to measure a fourth power and a fourth phase of the horizontally polarized radio wave; and obtain a second estimated amplitude and a second estimated phase of the Yth antenna according to the third power, the fourth power, the third phase, and the fourth phase.

13. The calibration system of claim 12, wherein the processor calibrate the Yth antenna further according to the second estimated amplitude and the second estimated phase.

14. The calibration system of claim 11, wherein when the Xth group has the first configuration, a vertically polarized radio wave radiated by the Yth antenna of the M antennas has a first set power, a vertically polarized radio wave radiated by at least one Zth antenna of the M antennas has a second set power, and a vertically polarized radio wave radiated by the M antennas excepting the Yth antenna and the at least one Zth antenna has a third set power.

15. The calibration system of claim 14, wherein when the Xth group has the second configuration, the Yth antenna of the M antennas is turned off, the vertically polarized radio wave radiated by the at least one Zth antenna of the M antennas has the second set power, and the vertically polarized radio wave radiated by the M antennas excepting the Yth antenna and the at least one Zth antenna has the third set power.

16. The calibration system of claim 14, wherein the first set power is greater than the second set power, the second set power is greater than the third set power.

17. The calibration system of claim 14, wherein the Yth antenna and the at least one Zth antenna are controlled by a first beam forming circuit.

18. The calibration system of claim 17, wherein the M antennas excepting the Yth antenna and the at least one Zth antenna are controlled by a second beam forming circuit different from the first beam forming circuit.

* * * * *